US011030456B1

(12) United States Patent
Crosby et al.

(10) Patent No.: US 11,030,456 B1
(45) Date of Patent: Jun. 8, 2021

(54) SYSTEMS AND METHODS FOR GEO-LOCALIZATION IN SENSOR-DEPRIVED OR SENSOR-LIMITED ENVIRONMENTS

(71) Applicant: Booz Allen Hamilton Inc., McLean, VA (US)

(72) Inventors: Courtney Crosby, Colorado Springs, CO (US); Jessica Yang, Fremont, CA (US); Adam Letcher, Arlington, VA (US); Alec McLean, Bethesda, MD (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 17/163,005

(22) Filed: Jan. 29, 2021

(51) Int. Cl.
*G06K 9/00* (2006.01)
*G01S 5/16* (2006.01)
*G06T 7/77* (2017.01)
*G01C 11/02* (2006.01)
*G06N 20/00* (2019.01)

(52) U.S. Cl.
CPC ........... *G06K 9/0063* (2013.01); *G01C 11/02* (2013.01); *G01S 5/16* (2013.01); *G06T 7/77* (2017.01); *G06N 20/00* (2019.01); *G06T 2207/10032* (2013.01)

(58) Field of Classification Search
CPC .......... G06K 9/0063; G01S 5/16; G06T 7/77; G06T 2207/10032; G01C 11/02; G06N 20/00
See application file for complete search history.

(56) References Cited

U.S. PATENT DOCUMENTS

| | | | | |
|---|---|---|---|---|
| 10,719,641 | B2 * | 7/2020 | Morczinek | G06K 9/0063 |
| 2014/0064554 | A1 * | 3/2014 | Coulter | G06T 7/33 |
| | | | | 382/103 |
| 2015/0339823 | A1 * | 11/2015 | Siomina | G01C 21/20 |
| | | | | 348/135 |
| 2016/0063732 | A1 * | 3/2016 | Chen | G06K 9/4604 |
| | | | | 382/108 |
| 2017/0301104 | A1 * | 10/2017 | Qian | G06F 16/583 |
| 2020/0180612 | A1 * | 6/2020 | Finelt | B60W 60/0027 |
| 2020/0226352 | A1 * | 7/2020 | Coulter | G06K 9/4671 |

* cited by examiner

*Primary Examiner* — Tom Y Lu
(74) *Attorney, Agent, or Firm* — Buchanan Ingersoll & Rooney PC (57) ABSTRACT

A method and system for geo-localization in sensor-deprived or sensor-limited environments includes receiving an image file for geo-localization of a location depicted by the image file in a sensor-deprived environment; applying a plurality of geo-localization modules to the image file; generating, by each of the plurality of geo-localization modules, a module output, each module output including a module geolocation for the location and a module confidence score for the module geolocation; generating an ensemble geolocation output, the ensemble geolocation output including an ensemble geolocation for the location and an ensemble confidence score for the ensemble geolocation, the ensemble geolocation output being a weighted combination of the module outputs; and displaying the ensemble geolocation output to a display.

28 Claims, 4 Drawing Sheets

SYSTEMS AND METHODS FOR GEO-LOCALIZATION IN SENSOR-DEPRIVED OR SENSOR-LIMITED ENVIRONMENTS

FIELD

Aspects of the present disclosure provide systems and methods for determining geolocation in a sensor-deprived or sensor-limited environment, and more particularly to determining a geolocation depicted by an image by ensembling two or more machine learning methodologies.

BACKGROUND INFORMATION

Determining an accurate geolocation is an important aspect of target location, asset recovery, and navigation. Currently, accurate geolocation generally relies on access to one or more sensors utilized by systems and techniques such as Global Positioning System (GPS), Global Navigation Satellite System (GNSS), Inertial Navigation System (INS), cell tower triangulation, Laser Range Finder LRF, etc. Current geo-localization approaches are dependent on these sensors and are therefore not effective in sensor-denied or sensor-limited environments such as rural environments or environments in which data signals are unavailable, erratic, or unreliable. Further, current geo-localization methods may use machine learning to circumvent the need for such sensors in determining geolocation by processing an image of a location. However, existing state of the art strategies that use machine learning to circumvent sensor dependency are specific to single domain methodologies (e.g., only shadow detection or only feature extraction) and thus their accuracy or applicability may be limited. Therefore, there is a need for a novel technical solution for determining an accurate geo-location based on an image in a sensor-deprived or sensor-limited environment.

SUMMARY

A method for geo-localization in sensor-deprived and sensor-limited environments is disclosed. The method can include receiving an image file for geo-localization of a location depicted by the image file in a sensor-deprived environment or sensor-limited environment; applying a plurality of geo-localization modules to the image file; generating, by each of the plurality of geo-localization modules, a module output, each module output including a module geolocation for the location and a module confidence score for the module geolocation; generating an ensemble geolocation output, the ensemble geolocation output including an ensemble geolocation for the location and an ensemble confidence score for the ensemble geolocation, the ensemble geolocation output being a weighted combination of the module outputs; and displaying the ensemble geolocation output to a display.

A system for geo-localization in sensor-deprived and sensor-limited environments is disclosed. The system can include an imaging device configured to receive an image file for geo-localization of a location depicted by the image file in a sensor-deprived environment or sensor-limited environment; a memory configured to store a plurality of geo-localization modules; a processor configured to apply a plurality of geo-localization modules to the image file; a processor configured to generate, by each of the plurality of geo-localization modules, a module output, each module output including a module geolocation for the location and a module confidence score for the module geolocation; a processor configured to generate an ensemble geolocation output, the ensemble geolocation output including an ensemble geolocation for the location and an ensemble confidence score for the ensemble geolocation, the ensemble geolocation output being a weighted combination of the module outputs; and a display device configured to display the ensemble geolocation output on a display.

BRIEF DESCRIPTION OF THE DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which.

Further areas of applicability of the present disclosure will become apparent from the following detailed description. It should be understood that the detailed descriptions of exemplary embodiments are intended for illustration purposes only and are not intended to limit the scope of the disclosure.

DETAILED DESCRIPTION

Geo-localization approaches utilizing machine learning (without the use of typical location sensors) fall into several categories including, but not limited to: scene processing, shadow detection, geographic tie point matching, query image matching, and semantic mapping. Scene processing relies on open-source imagery and is largely restricted (by accuracy and model training) to known locations, landmarks, and highly photographed areas. The disadvantage of scene processing in terms of geo-localization is that the inference cannot be extrapolated to the defense domain or other domains where geo-localization is less likely to be required in highly photographed locations. The accuracy of these scene processing models is also on the city/state scale (25 km) and are generally not reliable for precision locales (<1 km). Further, scene processing requires a deep learning process with extensive training (e.g., a global capability would require hundreds of millions of images) which would make learning every single feature viewed from every perspective on the entire globe a challenge due to both assembling an adequate training set and conducting a learning process. Thus, scene processing is not as comprehensive as a reference database, and therefore requires certain assumptions (inferences) about different features that it cannot recall. Shadow detection leverages algebraic processes with computer vision to detect shadows of objects in an image and reverse engineer the position of the sun or moon when the image was taken allowing for the identification of the precise location of the objects on the globe based on the calculated sun position. The disadvantages with shadow detection include the process being largely manual because the calculations must be extremely accurate; it is highly reliant on geometric shapes (e.g., a building); it is most accurate during the daytime (which limits its application in nighttime scenarios and overcast days); it requires that shadows be present and detectable; and although there are very limited circumstances in which a matrix is not required, generally a known camera matrix is required. Further, shadow detection typically requires multiple images and/or many processing steps. Geographic tie point matching takes a feature from an image and matches it to the same feature in other reference images to build a sequence to identify and calibrate the location on the globe. Likewise, geographic 3D reconstruction can use tie points (or other reference points) to aid in establishing camera perspective and calibration, which can then be used to identify a highly localized position but is not applicable when given global search areas. However, to be effective, geographic tie point matching requires known reference points (which may not be available for new locations, denied/contested locations where reference points cannot be extracted, or locations where reference points have changed) and existing image databases at the global scale, which do not exist. Query image matching matches features in a subject image to features in existing images stored in available, searchable image reference databases. Thus, query image matching is not reliable if the location is not highly photographed or the features/pixels/perspectives do not match well to images in the database. Further, query image matching requires a reference database which may not reflect all place or location types and may need to be updated periodically to reflect changes in the objects or associated environments (e.g., new streets being built, a mountain's topography that has changed due to a landslide, lighting variations, etc.). Such large databases may make infeasible the deployment of query image matching to small form factor devices that may lack sufficient power, processing speed, and storage. Semantic mapping maps an aerial image dataset to line-of-sight imagery or line-of-sight imagery to an aerial image dataset. The disadvantages of semantic mapping include relying on "domain adaptation" which requires having at least two domains, currently being limited to the United States (e.g., there are currently no models that cover other global areas), and suffering from inhibited performance when different spatial scales are introduced.

The present disclosure provides novel methods and systems for geo-localization in sensor-deprived and/or sensor-limited environments by ensembling two or more machine learning methodologies (e.g., geo-localization modules). While the terms "sensor-deprived" and "sensor-limited" can mean a complete lack of sensor functionality and an impeded or less than a typically desired full sensor capability, respectively, for purposes of brevity the term "sensor-deprived" may include "sensor-limited." By ensembling two or more machine learning geo-localization methodologies, exemplary embodiments of the methods and systems provided herein can overcome the disadvantages noted above for each individual geolocation machine learning methodology. While methodology ensembling has been used in other domains, such as the forensics domain with a mind toward micro biome features (e.g., fungi), the training is domain-specific and cannot be generalized to non-biological application (e.g., geo-localization). Also, the methods and systems of the present disclosure dynamically weight individual machine learning methodologies (e.g., geo-localization modules) within an ensemble of machine learning methodologies to produce a highly-accurate geolocation estimation. Likewise, methods and systems of the present disclosure apply filters and dynamically adapt the selection of geo-localization modules to correspond to the filters. Additionally, the methods and systems of the present disclosure dynamically adapt the selection of geo-localization modules to implement and dynamically select and adapt an ensemble of geo-localization modules that will produce the most accurate geolocation estimation based on the image features and other relevant geographic information. Thus, exemplary embodiments of the methods and systems provided herein dynamically adapt to whichever geolocation methodology provides the most accurate geo-estimation while also being fault tolerant to unknown variables in the operational scenario.

System for Geo-Localization in a Sensor-Deprived or Sensor-Limited Environment

Figure 1A:
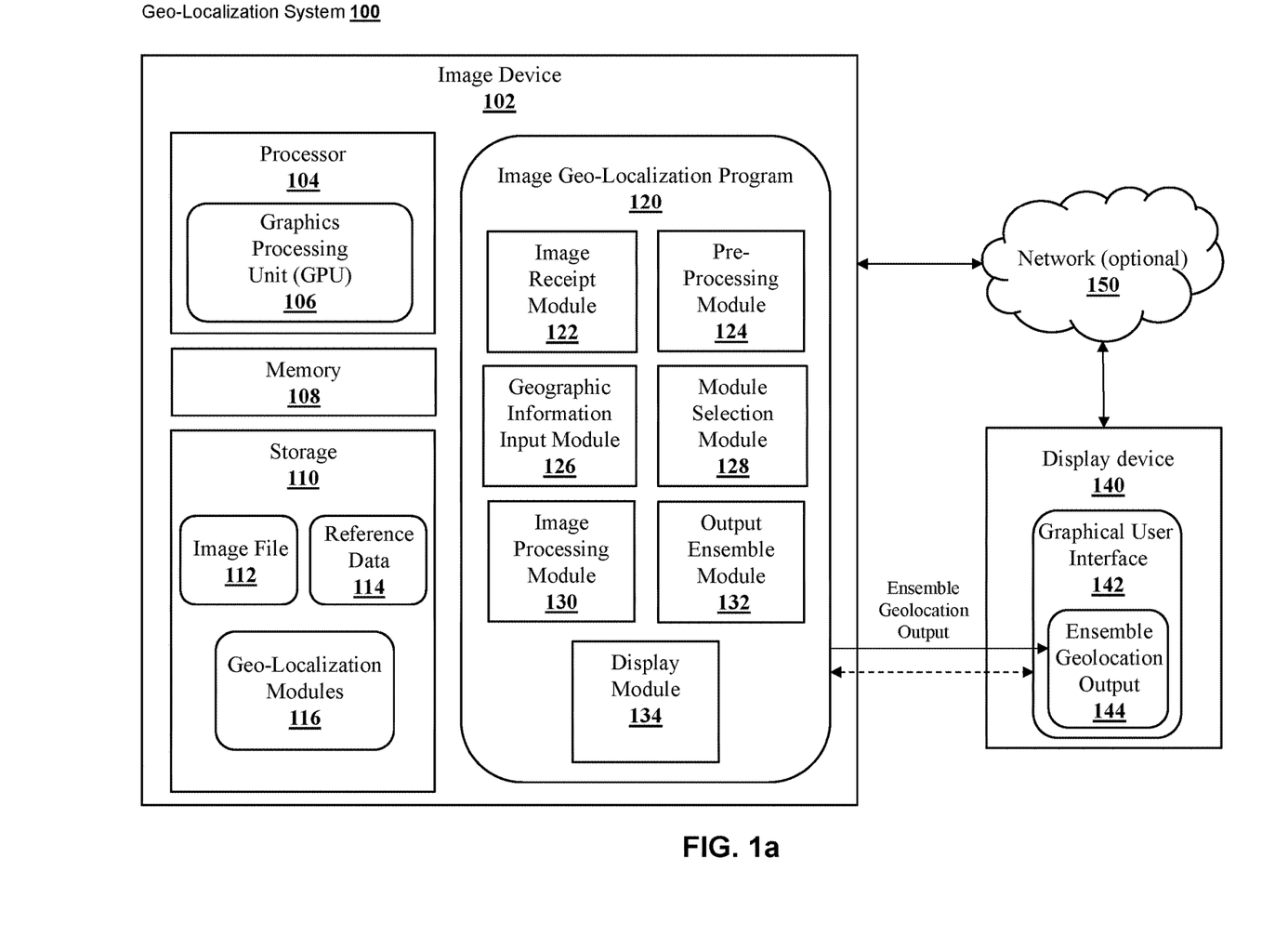
FIG. 1a illustrates a system for geo-localization in a sensor-deprived environment of an object in accordance with exemplary embodiments.

FIG. 1a illustrates an exemplary system 100 for geo-localization in a sensor-deprived or sensor-limited environment in accordance with exemplary embodiments. The system 100 includes an image device 102, and a display device 140 optionally connected via a network 150.

The image device 102 includes a processor 104, a memory 106, a storage 110, and a geo-localization program 120. The image device 102 may be any image device capable of capturing an image (e.g., the image file 112) such as, but not limited to, a camera, a cellphone, binoculars, a monocular, etc. The image device 102 may be an image device capable of capturing images in any spectrum including all visible light and non-visible light spectrums. In an exemplary embodiment, the image device 102 is an edge computing device. While the image device 102 and the display device 140 are illustrated as separate devices, it can be appreciated that the image device 102 and the display device 140 may be a single device. The image device 102 may be a stand-alone device or incorporated into another device or vehicle. For example, the image device 102 may be part of a car, a boat, a plane, a drone, or a military vehicle, etc.

The processor 104 may include a graphics processing unit (GPU) 106. The processor 104 may be a special purpose or general purpose processor device specifically configured to perform the functions discussed herein. The processor 104 unit or device as discussed herein may be a single processor, a plurality of processors, or combinations thereof. Processor devices may have one or more processor "cores." In an exemplary embodiment, the processor 104 is configured to perform the functions associated with the modules of the image geo-localization program 120 as discussed below with reference to FIG. 2. The GPU 106 may be specially configured to perform the functions of the image geo-localization program 126 discussed herein. For example, in exemplary embodiment, the GPU 106 is configured to run machine learning models such as, but not limited to, the geo-localization modules 116.

The memory 108 can be a random access memory, read-only memory, or any other known memory configurations. Further, the memory 108 can include one or more additional memories such as the storage 110, etc. The memory 108 and the one or more additional memories can be read from and/or written to in a well-known manner. In an embodiment, the memory 108 and the one or more additional memories can be non-transitory computer readable recording media. Memory semiconductors (e.g., DRAMs, etc.) can be means for providing software (e.g., the image geo-localization program 120) to the image device 102. Computer programs, e.g., computer control logic, can be stored in the memory 124.

The storage 110 includes an image file 112, reference data 114, and geo-localization modules 116. The storage 110 can be deployed on one or more nodes, e.g., storage or memory nodes, or more processing-capable nodes such as a server computer, desktop computer, notebook computer, laptop computer, tablet computer, handheld device, smart-phone, thin client, or any other electronic device or computing system capable of storing, compiling, and/or processing data and computer instructions, e.g., the image file 112, the reference data 114, and the geo-localization modules 116, and receiving and sending that data to and from other computing devices, such as the display 140. For example, the storage 110 is a collection of the geo-localization modules 116 for determining a geolocation depicted by an image (e.g., the image file 112) that can be accessed and executed by the GPU 106 and the image geo-localization program 120. The storage 110 can be any suitable storage configuration, such as, but not limited to a relational database, a structured query language (SQL) database, a distributed database, or an object database, etc. Suitable configurations and storage types will be apparent to persons having skill in the relevant art.

The image file 112 can be any image file capable of being captured, stored, compiled, or received by the image device 102. The image file 112 may be a single image file or any number of image files captured or received by the image device 102. In an exemplary embodiment, the image file 112 is an image captured by the image device depicting an unknown global location. The image file 112 may be any image file format from which a single still image may be captured such as, but not limited to, a photograph, or a video, etc.

The reference data 114 may include any data used by the geo-localization modules 116 and/or the image geo-localization program 120 in determining a geolocation depicted by an image (e.g., the image file 112). The reference data 114 may be any data capable of being captured, stored, compiled, by the image device 102 and transmitted to or received by other computing device such as the display device 140. For example, the reference data 114 includes, but is not limited to, reference images, MGRS s2 geometries, topographical references, maps, local flora or fauna information, solar lookup tables, etc. The reference data 114 may be used by the geo-localization modules 116 in generating the module outputs or by the image-geo-localization program 120 in ensembling the geo-localization modules 116 and generating the ensemble geolocation output as discussed in more detail below with reference to FIG. 2. For example, the reference data 114 may include data that can be used as other relevant information such as, but not limited to, maps, country lists, calendars, clocks, etc.

Figure 1B:
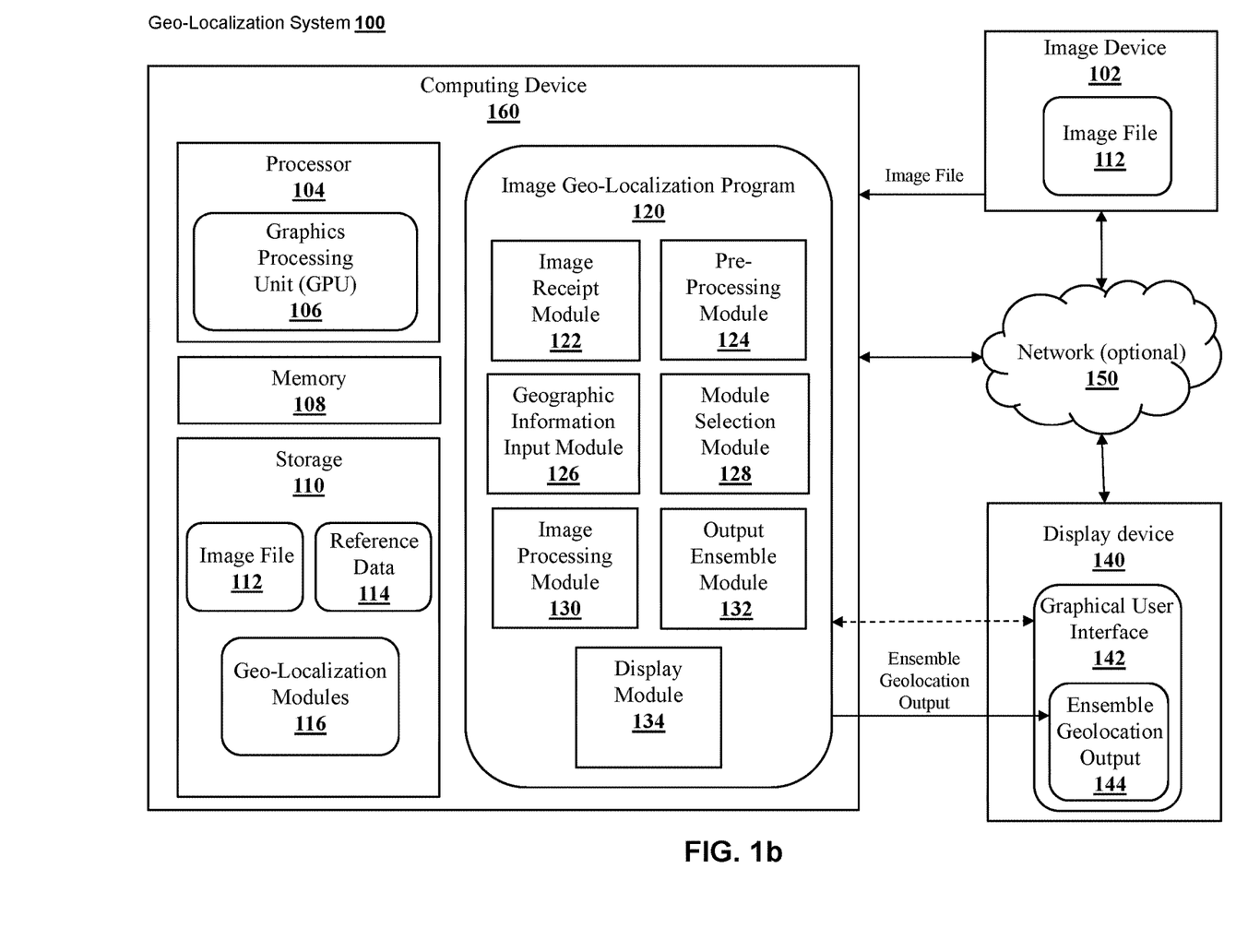
FIG. 1b illustrates a system for geo-localization in a sensor-deprived environment of an object in accordance with exemplary embodiments.
Figure 1C:
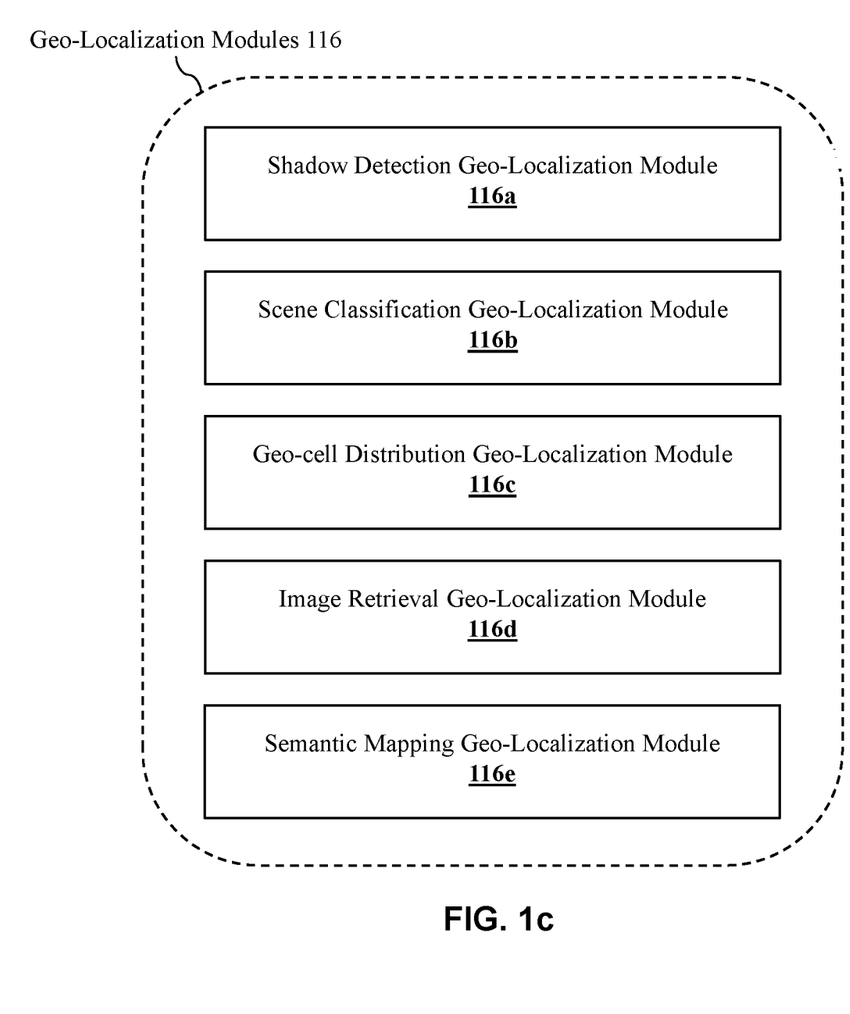
FIG. 1c illustrates example machine learning modules of the system illustrated in FIGS. 1a-b in accordance with exemplary embodiments.

The geo-localization modules 116 are machine leaning models or machine learning algorithms implemented in software components that process an image file to determine the geolocation of a location or object depicted in an image file (e.g., the image file 112). While reference is made to geo-localization modules, the terms modules, models, and/or algorithms are used herein interchangeably to refer to a machine leaning model or methodology used for determining a geolocation depicted by an image. The geo-localization modules 116 may be any known machine learning model. Referring to FIG. 1c, the geo-localization modules 116 can include a shadow detection geo-localization module 116a, a scene classification geo-localization module 116b, a geo-cell distribution geo-localization module 116c, an image retrieval geo-localization module 116d, and a semantic mapping geo-localization module 116e. The geo-localization modules 116 can each ingest an image (e.g., the image file 112) and process the image to generate module outputs that include a module geolocation (e.g., a latitude coordinate and a longitude coordinate) and a module confidence score of the module geolocation. While FIG. 1c illustrates five example geo-localization modules 116, it can be appreciated that the geo-localization modules 116 may be comprised of fewer than or more than five geo-localization machine learning modules and/or other machine learning modules in other domains. In an exemplary embodiment, the geo-localization modules 116 may be optimized for the smallest graphics processing unit (GPU) classes of the image device 102. In an exemplary embodiment, the geo-localization modules 116 are ensembled such that at least two of the modules 116a-e are executed in parallel or sequentially. The geo-localization modules 116 may be updated, modified, or changed, etc. as new and more sophisticated geo-localization machine learning algorithms (e.g., geo-localization modules 116) are developed. For example, developers and engineers can create new geo-localization modules 116 and add them to the storage 110, update (e.g., re-train, etc.) a geo-localization module 116 already in the storage 110, remove one of the geo-localization modules 116, or replace one of the geo-localization modules 116, etc.

The geo-localization modules 116 may be any known machine learning model. For example, the shadow detection module 116a may include an algorithm or an ensemble of sub-algorithms that ingest an image file and proceeds to: extract image device 102 matrix and bearing; extract horizon line from the image file; define coordinate system; identify shadow/object relationships in image file; identify pixel values of shadows and peaks; calculate geometries; calculate solar parameters (e.g., using Data Time Group (DTG) and optionally Earth Orientation Parameter Prediction (EOPP)); and solve for latitude and longitude. The scene classification module 116b may include an algorithm that ingests an image file and proceeds to: extract image file features and output classes; label and filter image file scenes; estimate location; calculate scene probabilities; calculate cell probabilities; create a grid of latitude and longitude squares; and calculate centroid. The geo-cell distribution module 116c may include an algorithm that ingests an image file and proceeds to: extract image pixels; classify the images; normalize the images; define scene geometries; label and filter scenes; progressively determine locations using a hierarchical approach; output probability; create a grid of latitude and longitude squares; and calculate centroid. The image retrieval module 116d may include an algorithm that ingests an image file and proceeds to: establish representations of the image file; extract features of the image file; compute neighbors; estimate probability density by image similarity; and choose highest density point. The semantic mapping module 116e may include an algorithm that ingests an image file and proceeds to: establish feature representations using aerial imagery; extract features from two domains; transfer feature representations; compute neighbors; rank feature matches; and convert graph output to centroid. The above machine learning processes for the geo-localization modules 116 provide example processes of the geo-localization modules 116, but it can be appreciated by a person of ordinary skill in the art that the processes can include fewer or more steps and omitting or replacing steps, as appropriate.

The image geo-localization program 120 is a software component that utilizes the geo-localization modules 116 stored in the storage 110 to determine the geolocation depicted by an image (e.g., the image file 112). In an exemplary embodiment, the image geo-localization program 120 includes an image receipt module 122, a pre-processing module 124, a geographic information input module 126, a module selection module 128, an image processing module 130, an ensemble output module 132, and a display module 134. The image geo-localization program 120 is a software component specifically programmed to implement the methods and functions disclosed herein for determining a geo-location in a sensor-deprived or sensor-limited environment. The image geo-localization program 120 and the modules 122-134 are discussed in more detail below with reference to FIG. 2.

The image geo-localization program 120 can include a graphical user interface 142. The graphical user interface 142 can include components used to receive input from the image device 102, and/or the display device 140 and transmit the input to the image geo-localization program 120, or conversely to receive information from the image geo-localization program 120 and display the information on the image device 102, and/or the display device 140. In an example embodiment, the graphical user interface 142 uses a combination of technologies and devices, such as device drivers, to provide a platform to enable users of the image device 102, and/or the display device 140 to interact with the image geo-localization program 120. In the example embodiment, the graphical user interface 142 receives input from a physical input device, such as a keyboard, mouse, touchpad, touchscreen, camera, microphone, etc. In an exemplary embodiment, the graphical user interface 142 may display an ensemble geolocation output 144 that includes latitude and longitude coordinate pair with a confidence score for those latitude and longitude coordinates. In exemplary embodiments, the graphical user interface 142 may receive user inputs such as a selection or de-selection of one or more of the geo-localization modules 116. The selection or de-selection of the geo-localization modules 116 may be facilitated with a toggle switch for each of the geo-localization modules 116 or by simply selecting or de-selecting each geo-localization module using an input device, etc. The image geo-localization program 120 may also receive other relevant geographic information input via the graphical user interface 140 such as, but not limited to, a geographic area, a country, a compass direction, a laser range finder output, a date, a time, etc. The input of the other relevant geographic information may be facilitated by, for example, but not limited to, a drop-down menu, a text input field, drawing a free form boundary on an image (e.g., a map stored as reference data 114), etc. In an exemplary embodiment, the other relevant geographic information input is highly generalized location input. For example, a user may know that they are in a specific region of the world or even which country they are in, but not their exact location within that region or country. The image geo-localization program 120 can use the other relevant geographic information input to refine the module outputs of the geo-localization modules 116 as will be described in more detail below with reference to FIG. 2. While the graphical user interface 142 is illustrated as part of the display device 140, it can be appreciated that the graphical user interface 142 is a part of the image geo-localization program 120 and may be a part of the image device 102, and/or the display device 140.

The display device 140 can include the graphical user interface 142. The display device 140 be any computing device, such as, but not limited to, a cell phone, a server computer, a desktop computer, a notebook, a laptop computer, a tablet computer, a handheld device, a smart-phone, a thin client, or any other electronic device or computing system capable of receiving display signals from another computing device, such as the image device 102, etc. and outputting those display signals to a display unit such as, but not limited to, an LCD screen, plasma screen, LED screen, DLP screen, CRT screen, etc. The display device 140 may communicate with the image device 102 via a hard-wired connection or via the network 150. For example, the display device 140 may have a hard-wired connection to the image device such as, but not limited to, a USB connection, an HDMI connection, a display port connection, a VGA connection, or any other known hard-wired connection capable of transmitting and/or receiving data between the image device 102 and the display device 140. While the display device 140 is illustrated as being separate from the image device 102, it can be appreciated that the display device 140 can be a part of the image device 102.

The optional network 150 may be any network suitable for performing the functions as disclosed herein and may include a local area network (LAN), a wide area network (WAN), a wireless network (e.g., WiFi), a personal area network (PAN) (e.g. Bluetooth), a near-field communication (NFC) network, a mobile communication network, a satellite network, the Internet, fiber optic, coaxial cable, other hardwired networks, infrared, radio frequency (RF), or any combination of the foregoing. Other suitable network types and configurations will be apparent to persons having skill in the relevant art. In general, the network 150 can be any combination of connections and protocols that will support communications between the image device 102 and the display device 140. In some embodiments, the network 150 may be optional based on the configuration of the storage 110, the computer device 120, and the display device 140.

While the processor 104, memory 108, storage 110, and image geo-localization program 120 are illustrated as part of the image device 102, it can be appreciated that each of these elements or a combination thereof can be a part of a separate computing device. For example, with reference to FIG. 1b, the processor 104, the memory 106, the storage 110, and the image geo-localization program 120 may be a part of the computing device 160. The computing device 160 may be a server computer, a desktop computer, a notebook, a laptop computer, a tablet computer, a handheld device, a smart-phone, a thin client, or any other electronic device or computing system capable of storing, compiling, and/or processing data, e.g., the image file 112 or the reference data 114, and receiving and sending that data to and from other computing devices, such as the image device 102, and the display device 140. In an exemplary embodiment, the computing device 160 may be a general purpose GPU specially configured to perform the functions of the image geo-localization program 120 discussed herein. In an exemplary embodiment, the computing device 160 is an edge computing device that incorporates the image device 102, the database 110, and the display device 140, or any combination thereof. In exemplary embodiments, the computing device 160 can be part of a cloud-hosted, globally available computing system providing access to the reference data 114, the collection of geo-localization modules 116, and the image geo-localization program 120. Thus, the computing device 160 can provide global access, via the internet or any other suitable network (e.g., the network 150), to a collection of geo-localization modules 116 that are updated regularly to keep up with new and evolving geo-localization methodologies.

Method for Geo-Localization in a Sensor-Deprived or Sensor-Limited Environment

Figure 2:
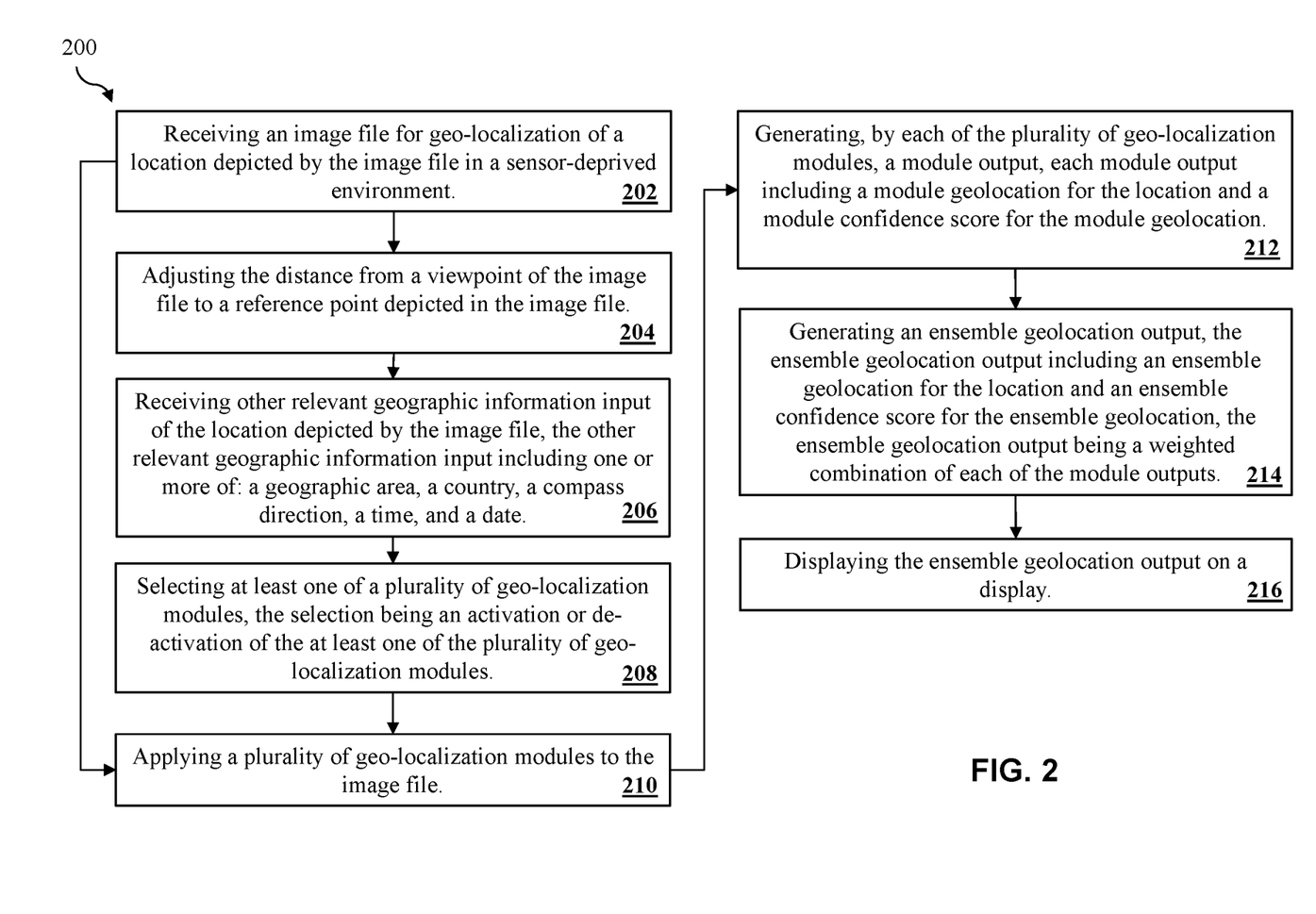
FIG. 2 illustrates an exemplary flowchart of a method for geo-localization in a sensor-deprived or sensor-limited environment in accordance with exemplary embodiments.

FIG. 2 illustrates a flowchart of an exemplary method 200 for determining a geolocation in a sensor-deprived or sensor-limited environment in accordance with exemplary embodiments. The system 100 and method 200 can aid in determining a geolocation based on an image in several scenarios such as, but not limited to, real-time outdoor geo-localization, personnel/hostage recovery, captured material recovery, open-source data meta-tagging, and any other scenario where an accurate geolocation would be useful. Regarding real-time outdoor geo-localization scenarios, the methods and systems disclosed herein can aid an individual (e.g., a soldier or a lost hiker) in an outdoor environment to determine where they are located on the globe when they do not have access to conventional location assistance sensors (e.g., GPS/GNSS module, compass, inertial, laser range finder, etc.) and have only the line-of-sight (LOS) imagery available through an optical form factor (e.g., the image device 102). Further, the methods and systems disclosed herein can help an individual determine an accurate geolocation if the individual has no points of reference (e.g., starting point or known landmark). Regarding personnel/hostage recovery scenarios, the methods and systems disclosed herein can aid a downed pilot or a hostage to accurately identify their precise location to facilitate rescue. Currently, downed pilots move through a pre-planned evasion corridor where rescue personnel will dedicate search assets. However, the pilot must know where they are in relation to that corridor. Additionally, other location methods require signals that may be exploited by the enemy. Similarly, a hostage's location may be unknown but exposed in the form of a hostage video, which the methods and systems disclosed herein can analyze to determine a geolocation from an image within or captured from the video. Regarding captured material recovery, the methods and systems disclosed herein can aid operators on a covert mission to locate Captured Enemy Material (CEM) based on photographs and/or video void of EXIF metadata that indicates the place of origin. Thus, the methods and systems disclosed herein can identify an accurate geolocation of the CEM based on the imagery in order to identify potential logistics, movements, intelligence, communications, safe houses, munitions, and/or materials of a High-Value Target (HVT) whose location or usage in the area was previously unknown. Regarding open-source data meta-tagging, the methods and systems disclosed herein can analyze image data of businesses and organizations or publicly available image data to determine a geolocation and add a geotag to the image data. Being able to estimate the location of images allows for a more efficient and enriched dataset that is easily searched and analyzed. For example, law enforcement agencies at the city, state, or federal levels need to be able to consistently identify the location of images in order to uncover connections between different pieces of evidence. In the commercial space as well, search providers, and any company that leverages search capabilities, rely on being able to provide highly relevant results to their users, and geolocation data can enrich the utility and relevance of those results.

Referring back to FIG. 2, the method 200 can include block 202 of receiving an image file (e.g., the image file 112) for geo-localization of a location depicted by the image file in a sensor-deprived or sensor-limited environment. The computer device 120 may receive the image file 112 from the image device 102 or from the storage 110. For example, the image file 112 may be a photograph taken by a user of the image device 102 to use in determining their own geolocation. In another example, the image file 112 may be an image stored on a database (e.g. the storage 110) that depicts a location for which a user wishes to know the geolocation (e.g., a hostage photo, a CEM photo, etc.). In an exemplary embodiment, the image receipt module 122 can be configured to execute the method of block 202.

In an exemplary embodiment, the method 200 can include block 204 of adjusting the distance from a viewpoint of the image file to a reference point depicted in the image file. For example, the image file 112 can be a photograph taken without magnification (e.g., a landscape image taken from 1000 m away) and the frame size of the image file would represent a large geographic width (e.g., on the order of 400-1000 m wide of horizon/landscape/imagery). Such a large visual area may be helpful if there are one or more landmarks (e.g., a mountain topography, a lake, a building, etc.) or if there are two landmarks in the image file 112 that are significantly far apart but that together would help in determining the location. However, if there are no landmarks, it can be more useful to adjust the image file (e.g., using image device magnification) using known image scaling/tiling techniques so that useful features (e.g., those features relied upon by the geo-localization modules 116) of the image file 112 are clearer. In exemplary embodiments, the block 204 may be an optional pre-processing step in the method 200. In an exemplary embodiment, the pre-processing module 124 can be configured to execute the method of block 204.

In an exemplary embodiment, the method 200 can include block 206 of receiving other relevant geographic information input of the location depicted by the image file 112. The other relevant geographic information input can include, but is not limited to, a geographic area, a country, a compass direction, a time, and a date, etc. The other relevant geographic information input can be received from a user of the image device 102 (e.g., via the graphical user interface 142), the image device 102 (e.g., from the memory 108, or the storage 110, etc.), or received from another computing device such as the display device 140. For example, a user may be lost and trying to determine their geolocation, but may know the country they are in and thus they may be able to input the name of the country (e.g., via the graphical user interface 142). As another example, a soldier may be deployed to a specific area of responsibility within a combatant command and can select that specific area on a map or draw a boundary on a map of the area they believe themselves to be in. As a further example, time and date information may be extracted from the image device 102 such as from an internal clock, etc. The other relevant geographic information may be used by the geo-localization modules 116 in determining the geolocation of the location depicted by the image file 112 or may be used by the image geo-localization program 120 in generating the ensemble output 144. Therefore, the other relevant geographic information input may be used by the image geo-localization program 120 as part of the input (e.g., along with the image file 112) to the geo-localization modules 116 or to dynamically weight the module outputs of the geo-localization modules 116 as discussed in more detail below. For example, time and date information may be used by the shadow detection geo-localization module 116a to determine a location of the sun. As another example, country name information may be used by the image geo-localization program 120 in dynamically weighting the module outputs (e.g., a higher weight to module outputs with geolocations within the country and a lower weight to module outputs with geolocations outside the country). In an exemplary embodiment, the geographic information input module 126 can be configured to execute the method of block 206.

In an exemplary embodiment, the method 200 can include block 208 of selecting at least one of a plurality of the geo-localization modules 116, the selection being an activation of at least two of the plurality of geo-localization modules 116 and the de-activation of the unselected modules of the geo-localization modules 116. An exemplary embodiment of the block 208 might begin a geo-localization process with all the geo-localization modules 116 being activated and the selection is a de-activation of one or more of the geo-localization modules 116. Another exemplary embodiment of the block 208 might begin a geo-localization process with all geo-localization modules 116 being de-activated and the selection being the activation of the selected modules of the geo-localization modules 116. Another exemplary embodiment of the block 208 might activate (keep activated) all selected modules of the geo-localization modules 116 and deactivate (or keep de-activated) all unselected modules of the geo-localization modules 116, i.e., no assumption is made about the activation or de-activation status of the modules when the block 208 is engaged. The selection may be received from a user of the image device 102 and/or the display device 140 via the graphical user interface 142. The selection (e.g., the activation or de-activation) of one or more of the geo-localization modules 116 enables the image geo-localization program 120 to return a more accurate result (e.g., a more accurate ensemble geolocation output) and may result in a faster processing time (e.g. fewer geo-localization modules 116 to run). For example, the graphical user interface 142 may be displayed on the display device 140 to a user and the user may select or de-select one or more of the geo-localization modules 116 to apply to the image file 112. The user may select or de-select one or more of the geo-localization modules 116 based on conditions present or absent in the image file 112. For example, the image file 112 may be a photograph taken in an open field or desert where there are no shadows present; therefore, the user may de-select the shadow detection geo-localization module 116a because under those conditions (i.e., no shadows) the shadow detection geo-localization module 116a would return an inaccurate or null result. The selection may be received from the image geo-localization program 120 based on a module output of one or more of the geo-localization modules 116. Continuing with the above example with an image depicting an open field or desert where there are no shadows present, the shadow detection geo-localization module 116a may generate a null or inaccurate output and therefore the image geo-localization program 120 would turn-off, de-activate, or de-select the shadow detection geo-localization module 116a. In exemplary embodiments, the block 208 may be an optional step in the method 200. For example, the image geo-localization program 120 may run all the geo-localization modules 116 that may have applicability (or not) to the conditions depicted by the image file 112. The image geo-localization program 120 may determine which of the geo-localization modules 116 to apply automatically based on the image file 112 and/or the module outputs. In an exemplary embodiment, the module selection module 128 can be configured to execute the method of block 208.

In an exemplary embodiment, the method 200 can include block 210 of applying a plurality of geo-localization modules 116 to the image file 112. In an exemplary embodiment, the image geo-localization program 120 applies at least two geo-localization modules 116 to the image file 112. In an exemplary embodiment, the image processing module 130 can be configured to execute the method of block 210.

In an exemplary embodiment, the method 200 can include block 212 of generating, by each of the plurality of the geo-localization modules 116, a module output for each module. The module outputs include a module geolocation for the location depicted by the image file 112 and a module confidence score for the module geolocation. The module geolocation can include, but is not limited to, a latitude coordinate and longitude coordinate pair, an MGRS grid, and an S2 cell, etc. The confidence score may be output as a percentage (e.g., 100% indicating absolute confidence in the geolocation and 0% indicating no confidence or an error in determining the geolocation). In an embodiment, the confidence score may be an output on a scale such as, but not limited to, 1-5 with 5 indicating a high confidence in the geolocation and 1 being a low confidence in the geolocation. In exemplary embodiments the image geo-localization program 120 may dynamically apply weights to each of the geo-localization modules 116 based on overall past performance of each of the geo-localization modules 116 (e.g., if one of the geo-localization modules 116 was used in generating fifty percent of past ensemble geolocation outputs and another of the geo-localization modules 116 was used in generating only fifteen percent of past ensemble geolocation outputs, the image geo-localization program 120 may assign weights to each of those geo-localization modules accordingly). As another example, the geo-localization modules 116 may be dynamically weighted by applying a weight in real-time based on what is depicted by the image file 112 and for what each of the geo-localization modules 116 is trained. For example, if the image file 112 is a nighttime photograph with zero shadow visibility (e.g., clouds block the light from the moon) the image geo-localization program 120 may dynamically apply a weight of 0 to the shadow detection geo-localization module 116a, or any other suitable weight, so that the resulting confidence score results in the geolocation of the module being given a low weight. In another example, the image geo-localization program 120 may dynamically apply weights to each of the geo-localization modules 116 by computing the mean and median great circle distance (GCD) for each of the module outputs. Further the image geo-localization program 120 may dynamically filter the geo-localization modules 116 based on the other relevant geographic information input (e.g., if the other relevant geographic information input indicated the image file 112 depicts a geolocation within the United States and the module output of one of the geo-localization modules 116 indicates a geolocation outside the United States, the image geo-localization program 120 may down-weight that module of the geo-localization modules 116. For example, the ensemble geolocation output 144 can be weighted based on, but not limited to, the module confidence scores, known geographic references, or a probability density of the module outputs, etc. For example, geo-localization module outputs with higher module confidence scores are weighted more than geo-localization module outputs with lower module confidence scores. In another example, the ensemble geolocation output 140 can be generated by calculating the density of the module outputs using the center point of the cluster of module outputs (e.g., a median module confidence score of the module outputs). Further, the image geo-localization program 120 may filter out any outlier module outputs. For example, the geo-localization modules 116a-d may generate module outputs indicating a geolocation in country "A" while the geo-localization module 116e may generate a module output indicating a geolocation in country "B" and the image geo-localization program 120 may filter out or ignore the module output generated by the geo-localization module 116e. In an exemplary embodiment, the output ensemble module 132 can be configured to execute the method of block 214.

In an exemplary embodiment, the method 200 can include block 216 of displaying the ensemble geolocation output 144 to a display (e.g., the display device 140). For example, but not limited to, the ensemble geolocation output 144 may be output as coordinates and a percentage confidence score for those coordinates, a map with a pin-drop on the determined geolocation with a confidence score, etc. In an exemplary embodiment, the display module 134 can be configured to execute the method of block 216.

While steps of the method 200 and components of the system 100 and environments have been sequentially or serially identified using numbers and letters, such numbering or lettering is not an indication that such steps must be performed in the order recited, and is merely provided to facilitate clear referencing of the steps of the method 200. Furthermore, steps of the method 200 may be performed in parallel to perform their described functionality and some steps may be optional.

The above-disclosed novel methods and systems for geo-localization in sensor-deprived and sensor-limited environments provide several advantages over currently known geo-localization methodologies and systems. The methods and systems disclosed herein provide a novel geo-localization solution that is distance agnostic (e.g., pre-processing steps zoom/tile image files as appropriate, so the distance between the image device and objects in the image file is generally immaterial), spectral agnostic (e.g., does not rely on spectrum-specific information so it can ingest imagery from different spectrums (e.g., VIS vs. IR)), resolution agnostic (e.g., ability to output geolocation as long as the image file maintains a minimal resolution of 296×296 pixels (which virtually every commercial device meets)), feature agnostic (e.g., the geo-localization modules 116 are trained on hundreds of object classes and the image geo-localization program 120 can output geolocations regardless of whether specific features or scene context are present); light agnostic (e.g., the image geo-localization program 120 does not rely on specific illumination parameters like daytime or nighttime), and device agnostic (e.g., the image device may be any imaging device with any camera matrix). Further, the methods and systems disclosed herein provide a novel geo-localization solution that has several deployment advantages over known methodologies and systems such as, but not limited to, providing a small form factor program (e.g., the processor 104, the memory 108, the storage 110, and the image geo-localization program 120 are optimized for the smallest GPU classes and can be installed on handhelds such as cell phones, binoculars, monoculars, etc.), the image geo-localization program 120 is capable of being run in an edge or offline environment (e.g., internet/network availability is not required), and the image geo-localization program 120 can be integrated into existing applications like Android Team Awareness Kit (ATAK) (e.g. for receiving or transmitting data between the image device 102, the display device 140, and/or the computing device 160). The methods and systems disclosed herein provide a novel geo-localization solution that is fault tolerant such that if any part of the solution fails (e.g., one of the geo-localization modules 116a-116e), the other components/subcomponents continue functioning as normal. For example, if the shadow detection geo-localization module 116a experiences an error, none of the other geo-localization modules 116b-e in the ensemble is affected and those other modules are still able to output a module geolocation and associated module confidence score. Further, the containerization of system 100 makes it so that models (e.g., the geo-localization modules 116) can easily be updated and/or replaced as technology advancements occur over time. Thus, the architecture of the system 100 will remain the same while enabling customization and refinement.

A person having ordinary skill in the art would appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, one or more of the disclosed modules can be a hardware processor device with an associated memory.

A hardware processor device as discussed herein can be a single hardware processor, a plurality of hardware processors, or combinations thereof. Hardware processor devices can have one or more processor "cores." The term "non-transitory computer readable medium" as discussed herein is used to generally refer to tangible media such as a memory device.

Various embodiments of the present disclosure are described in terms of an exemplary computing device. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

A system, as used herein, can be in combination with one or more nodes, wherein the system resides in the one or more nodes. A node can be configured to interface or contain one or more components of the systems described herein.

A hardware processor, as used herein, can be a special purpose or general purpose processor device. The hardware processor device can be connected to a communications infrastructure, such as a bus, message queue, network, multi-core message-passing scheme, etc. An exemplary computing device, as used herein, can include a memory (e.g., random access memory, read-only memory, etc.), and can also include one or more additional memories. The memory and the one or more additional memories can be read from and/or written to in a well-known manner. In an embodiment, the memory and the one or more additional memories can be non-transitory computer readable recording media.

Data stored in the exemplary computing device (e.g., in the memory) can be stored on any type of suitable computer readable media, such as optical storage (e.g., a compact disc, digital versatile disc, Blu-ray disc, etc.), magnetic tape storage (e.g., a hard disk drive), solid-state drive, etc. An operating system can be stored in the memory.

In an exemplary embodiment, the data can be configured in any type of suitable data storage configuration or database configuration, such as a relational database, a structured query language (SQL) database, a distributed database, an object database, etc. Suitable configurations and storage types will be apparent to persons having skill in the relevant art.

The exemplary computing device can also include a communications interface. The communications interface can be configured to allow software and data to be transferred between the computing device and external devices. Exemplary communications interfaces can include a modem, a network interface (e.g., an Ethernet card), a communications port, a PCMCIA slot and card, etc. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, etc.

Memory semiconductors (e.g., DRAMs, etc.) can be means for providing software to the computing device. Computer programs (e.g., computer control logic) can be stored in the memory. Computer programs can also be received via the communications interface. Such computer programs, when executed, can enable the computing device to implement the present methods as discussed herein. In particular, the computer programs stored on a non-transitory computer-readable medium, when executed, can enable a hardware processor device to implement the exemplary methods, or similar methods, as discussed herein. Accordingly, such computer programs can represent controllers of the computing device.

Where the present disclosure is implemented using software, the software can be stored in a computer product or non-transitory computer readable medium and loaded into the computing device using a removable storage drive or communications interface. In an exemplary embodiment, any computing device disclosed herein can also include a display interface that outputs display signals to a display unit, e.g., LCD screen, plasma screen, LED screen, DLP screen, CRT screen, etc.

It will be appreciated by those skilled in the art that the present disclosure can be embodied in other specific forms without departing from the spirit or essential characteristics thereof. The presently disclosed embodiments are therefore considered in all respects to be illustrative and not restrictive. The scope of the disclosure is indicated by the appended claims rather than the foregoing description, and all changes that come within the meaning, range, and equivalence thereof are intended to be embraced therein.

What is claimed is:

1. A method for geo-localization in a sensor-deprived environment, the method comprising:
    receiving an image file for geo-localization of a location depicted by the image file in a sensor-deprived environment;
    applying a plurality of geo-localization modules to the image file;
    generating, by each of the plurality of geo-localization modules, a module output, each module output including a module geolocation for the location and a module confidence score for the module geolocation;
    generating an ensemble geolocation output, the ensemble geolocation output including an ensemble geolocation for the location and an ensemble confidence score for the ensemble geolocation, the ensemble geolocation output being a weighted combination of the module outputs; and
    displaying the ensemble geolocation output to a display.

2. The method of claim 1, comprising:
    scaling the distance from a viewpoint of the image file to a reference point depicted in the image file based on a distance between objects in the image.

3. The method of claim 1, comprising:
    receiving other relevant geographic information input of the location depicted by the image file, the other relevant geographic information input including one or more of: a geographic area, a country, a compass direction, a time, and a date.

4. The method of claim 1, comprising;
    selecting at least two of a plurality of geo-localization modules, the selection being an activation of the selected modules or de-activation of unselected modules of the plurality of geo-localization modules, wherein the selecting is at least one of a manual or automated dynamic process.

5. The method of claim 3, wherein applying the plurality of selected geo-localization modules includes:
    inputting the other relevant geographic information input into one or more of the plurality of geo-localization modules.

6. The method of claim 3, wherein generating the ensemble geolocation output includes:
    filtering at least one of the module outputs based on the other relevant geographic information input.

7. The method of claim 3, wherein generating the ensemble geolocation output includes:
    dynamically weighting the module outputs based on the other relevant geographic information input.

8. The method of claim 1, wherein generating the ensemble geolocation output includes:
    dynamically weighting the module outputs based on the module confidence scores wherein a module output having a higher module confidence score is weighted higher than a module output having a lower module confidence score.

9. The method of claim 1, wherein generating the ensemble geolocation output includes:
    computing a mean GCD and a median GCD of each of the module outputs; and
    dynamically weighting the module outputs based on the computed mean GCD and median GCD.

10. The method of claim 1, wherein generating the ensemble geolocation output includes:
    computing probability density for each of the module outputs; and
    dynamically weighting the module outputs based on the computed probability density.

11. The method of claim 1, wherein the plurality of geo-localization modules includes at least two of: a shadow detection module, a scene classification module, a geo-cell distribution module, an image retrieval module, and a semantic mapping module.

12. The method of claim 1, wherein the image file is received from an imaging device, the imaging device being at least one of: a camera, a cellphone, binoculars, and a monocular.

13. The method of claim 1, wherein applying a plurality of geo-localization modules to the image file is based on or more features of the image file and includes:
    dynamically weighting the module outputs based on past geo-localization module performance with past images having one or more similar features.

14. The method of claim 1, wherein the ensemble geolocation is one of: a latitude and longitude coordinate pair, an MGRS grid, and an S2 cell.

15. A system for geo-localization in a sensor-deprived environment, the system comprising:
    an imaging device configured to receive an image file for geo-localization of a location depicted by the image file in a sensor-deprived environment;
    a memory configured to store a plurality of geo-localization modules;

a processor configured to:
apply a plurality of geo-localization modules to the image file;
generate, by each of the plurality of geo-localization modules, a module output, each module output including a module geolocation for the location and a module confidence score for the module geolocation;
generate an ensemble geolocation output, the ensemble geolocation output including an ensemble geolocation for the location and an ensemble confidence score for the ensemble geolocation, the ensemble geolocation output being a weighted combination of the module outputs; and
a display device configured to display the ensemble geolocation output on a display.

16. The system of claim 15, wherein the processor is configured to:
scale the distance from a viewpoint of the image file to a reference point depicted in the image file based on a distance between objects in the image.

17. The system of claim 15, wherein the processor is configured to:
receive other relevant geographic information input of the location depicted by the image file, the other relevant geographic information input including one or more of: a geographic area, a country, a compass direction, a time, and a date.

18. The system of claim 13, wherein the processor is configured to:
select at least two of a plurality of geo-localization modules, the selection being an activation of the selected modules or de-activation of unselected modules of the plurality of geo-localization modules, wherein the selection is at least one of a manual or automated dynamic process.

19. The system of claim 17, wherein applying the plurality of geo-localization modules includes the processor configured to:
input the other relevant geographic information input into one or more of the plurality of geo-localization modules.

20. The system of claim 17, wherein generating the ensemble geolocation output includes the processor configured to:
filter at least one of the module outputs based on the other relevant geographic information input.

21. The system of claim 17, wherein generating the ensemble geolocation output includes the processor configured to:
dynamically weight the module outputs based on the other relevant geographic information input.

22. The system of claim 15, wherein generating the ensemble geolocation output includes the processor configured to:
dynamically weight the module outputs based on the module confidence scores wherein a module output having a higher module confidence score is weighted higher than a module output having a lower module confidence score.

23. The system of claim 15, wherein generating the ensemble geolocation output includes the processor configured to:
compute a mean GCD and a median GCD of each of the module outputs; and
dynamically weight the module outputs based on the computed mean GCD and median GCD.

24. The system of claim 15, wherein generating the ensemble geolocation output includes the processor configured to:
compute probability density for each of the module outputs; and
dynamically weight the module outputs based on the computed probability density.

25. The system of claim 15, wherein the plurality of geo-localization modules includes at least two of: a shadow detection module, a scene classification module, a geo-cell distribution module, an image retrieval module, and a semantic mapping module.

26. The system of claim 15, wherein the image file is received from an imaging device, the imaging device being at least one of: a camera, a cellphone, binoculars, and a monocular.

27. The system of claim 15, wherein applying a plurality of geo-localization modules to the image file is based on or more features of the image file and includes the processor configured to:
dynamically weight the module outputs based on past geo-localization module performance with past images having one or more similar features.

28. The system of claim 15, wherein the ensemble geolocation is one of: a latitude and longitude coordinate pair, an MGRS grid, and an S2 cell.

* * * * *